United States Patent [19]
Puckette et al.

[11] 3,774,167
[45] Nov. 20, 1973

[54] CONTROL LOGIC CIRCUIT FOR ANALOG CHARGE-TRANSFER MEMORY SYSTEMS

[75] Inventors: Charles McD. Puckette; Walter J. Butler, both of Scotia, N.Y.

[73] Assignee: General Electric Company, Schenectady, N.Y.

[22] Filed: Dec. 29, 1972

[21] Appl. No.: 319,352

[52] U.S. Cl. .......... 340/172.5
[51] Int. Cl. .......... G11c 19/00
[58] Field of Search .......... 340/172.5, 173; 307/304

[56] References Cited
UNITED STATES PATENTS

| | | | |
|---|---|---|---|
| 3,651,349 | 3/1972 | Kahng | 307/304 |
| 3,654,499 | 4/1972 | Smith | 340/173 C |
| 3,700,932 | 10/1972 | Kahng | 340/173.2 |
| 3,555,522 | 1/1971 | Martin, Jr. | 340/172.5 |

*Primary Examiner*—Paul J. Henon
*Assistant Examiner*—Paul R. Woods
*Attorney*—Louis A. Moucha et al.

[57] ABSTRACT

The operation of analog memory systems utilizing semiconductor charge-transfer devices is controlled by a control logic circuit including clock control logic, recirculation control logic and mode selector control logic. The clock control logic includes a first switch for selecting the repetition rate of bursts of clock pulses which read the analog input information signal into the memory unit of the system and a second switch for selecting the number of clock pulses in the burst. The recirculation control logic includes a switch for obtaining recirculation of the stored information and selecting the number of recirculations between successive read-ins of new analog information. The mode selector control logic determines the mode (read-in or recirculate) of operation of the memory system.

11 Claims, 10 Drawing Figures

PATENTED NOV 20 1973

3,774,167

SHEET 2 OF 4

CONTROL LOGIC CIRCUIT FOR ANALOG CHARGE-TRANSFER MEMORY SYSTEMS

Our invention relates to a logic circuit for controlling the operation of analog semiconductor charge-transfer memory systems, and in particular, to a circuit which provides the memory system with capability for accommodating a varying repetition rate of the read-in of new analog information and a varying size of the memory as well as for obtaining recirculation of the stored analog information.

Although digital semiconductor memory devices and systems incorporating them have previously been extensively used, analog semiconductor memory devices and systems are relatively new. Analog memory systems, especially those having nondestructive read-out capability, have many applications such as in correlators, bandwidth reduction systems and time-shared communication channels. A specific example of the time-shared communication channel is a time-shared video communication channel wherein the video display at each subscriber's monitor must be refreshed at an appropriate rate with information stored at the monitor. This refresh operation occurs while the video channel is being used to transmit information to other subscribers in the network, thereby allowing each subscriber to have a continuous picture on his monitor during the time that he is not actually receiving new information from the video channel. For example, in a time-shared video communication channel system with 90 CRT display units in the network, each of which has a frame rate of 30 frames per second, each subscriber must wait three seconds before receiving a new frame of video information. During that 3 second interval, some means of refreshing the video information that is displayed on the monitor is required.

Analog memory units are fabricated of devices which may be most generally defined as being charge-transfer elements. Typical examples of charge-transfer devices are the charge-coupled device (CCD), the surface-charge transistor (SCT), and the bucket-brigade delay line. Examples of non-semiconductor analog memory devices are LC (i.e., lumped constant filters that approximate delay lines) and quartz delay line structures. The application of one or more bucket-brigade delay lines in an analog memory system having a nondestructive read-out capability is described and claimed in concurrently filed patent application Ser. No. 319,351, entitled "Recirculation Mode Analog Bucket-Brigade Memory System" having the same inventors and assignee as the present invention. Such concurrently filed application is incorporated herein for purposes of providing the details of a bucket-brigade delay line embodiment of the analog memory unit component in an analog charge-transfer memory system.

The operation of the analog memory system, and in particular, the operation of the analog memory unit component thereof which utilizes charge-transfer devices, must be appropriately controlled as in the case of a digital memory system.

Therefore, one of the principal objects of our invention is to provide a logic circuit for controlling the operation of an analog memory system having the memory unit thereof fabricated from charge-transfer type devices.

Another object of our invention is to provide the logic circuit with controllably means for operating the memory system in a recirculating mode.

A further object of our invention is to provide the logic circuit with a controllable means for varying the period of the read-in and hold (store) cycle and the recirculate and hold cycle.

A still further object of our invention is to provide the logic circuit with a controllably means for varying the number of recirculations of the stored information in a nondestructive manner whereby the stored information can be repeatedly recalled.

Another object of our invention is to provide a variable burst length waveform generator in the clock control logic circuit portion of our logic circuit.

Briefly summarized, our invention is a logic circuit for controlling the operation of an analog memory system which has the memory unit thereof fabricated from charge-transfer type devices. The control logic circuitry determines the sequential operation of the analog memory system and includes a clock control logic, recirculation control logic and mode selector control logic. The clock control logic includes a clock generator for generating a continuous rectangular waveform voltage signal representing the clock pulses for operating the memory unit. The clock control logic also includes decode and binary dividers, a first multi-position switch and first NAND gate circuitry for obtaining a continuous rectangular waveform voltage signal that has a programmable repetition rate which determines the period of the read-in and recirculation cycles. The clock control logic further includes binary counters, a second multi-position switch and second NAND gate circuitry for determining the number of clock pulses generated for each read-in or recirculate cycle to thereby form a variable burst length waveform generator. The recirculation control logic includes binary dividers, a third multi-position switch and AND-NAND gate circuitry for obtaining a continuous pulsed waveform voltage signal that has a programmable repetition rate which determines the number of recirculations between successive read-ins of new information. The mode selector control logic includes an analog gate switch having the gating signals thereto applied from the recirculation control logic for determining the order in which the memory unit operates in an information read-in or memory recirculate mode. After the read-in operation, the clock generator is effectively turned off and the analog information is stored in the memory unit for a "hold" time interval determined by the clock control logic. After the "hold" period, the mode selector switch is actuated to obtain the recirculation mode of system operation wherein the stored information may be recirculated one or more times through a feedback network including an automatic gain control or fixed gain block by sequentially turning on the clock generator for the required burst of clock pulses, and then turning the clock generator off for the "hold" time; this sequence being repeated for each recirculation. The recirculation control logic then terminates the recirculation mode by turning off the clock generator and actuating the mode selector switch into its new information input position. The control circuitry then repeats the sequence of operations with respect to a new analog input signal.

The features of our invention which we desire to protect herein are pointed out with particularity in the appended claims.

The invention itself, however, both as to its organization and method of operation, together with further objects and advantages thereof may best be understood by reference to the following description taken in connection with the accompanying drawings wherein like parts in each of the several figures are identified by the same reference character and wherein.

Figure 1:
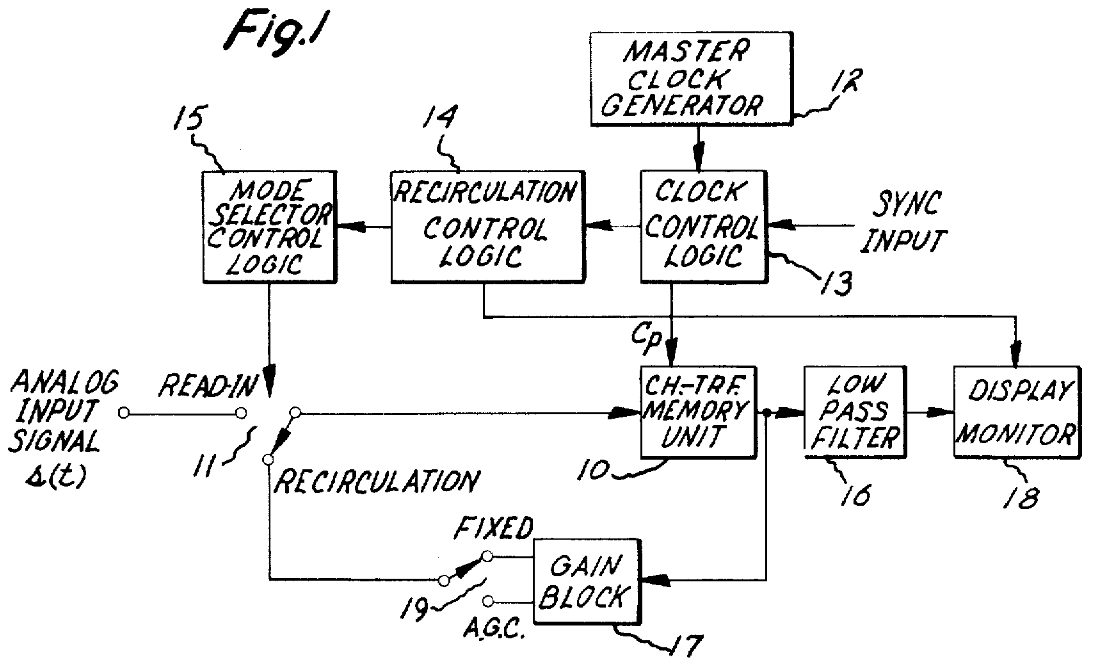
FIG. 1 is a general block diagram of our analog charge-transfer memory system including the control logic circuit.

Referring now to FIG. 1, there are shown in block diagram form the basic components of our analog charge-transfer memory system which may be selectively operable in a recirculation mode. The system includes a charge-transfer memory unit 10 having an input to which is selectively applied an analog input signal $s(t)$ representing particular analog information in a first position (or state) of mode selector switch 11 and which provides the memory recirculation mode of operation in a second state thereof. Switch 11 is of the electronic type and may comprise a twin MOSFET analog gate switch as will be described hereinafter with reference to FIG. 4. The analog input signal $s(t)$ is generally of an alternating type having both positive and negative polarity components and is assumed to be sinusoidal although it can have other wave shapes and may also include a DC level. The charge-transfer memory unit 10 in one embodiment includes a bucket-brigade delay line consisting of N delay line stages fabricated from MOSFET transistors. The memory unit may also be fabricated from charge-coupled devices and surface-charge transistors as other examples of charge-transfer devices. However, for purposes of explaining a typical memory unit, the description herein will be limited to the bucket-brigade delay line (BBDL) memory unit fabricated from MOSFET transistors.

The bucket-brigade circuit, herein abbreviated to BBDL for bucket-brigade delay line, is variously described as a sampled-data circuit or as a digitally controlled analog charge transfer circuit, but may be most simply described as an analog signal shift register. The bucket-brigade circuit thus provides a means for realizing an electronically variable delay line which has many uses in analog signal processing. The conventional bucket-brigade circuit may be generally described as a series array of capacitors interconnected by suitable electronic switches which, when implemented in monolithic form, may be transistors of any type such as bipolar or the field effect type MOSFET, JFET or MESFET. Information is stored as charge packets in such array of capacitors and is caused to be propagated through the array at a rate determined by the (clock) rate at which the switches are sequentially opened and closed. The bucket-brigade circuit, therefore, provides a noninductive means for implementing an analog delay line, the delay of which is controlled by an external clock, in single monolithic integrated circuit form.

The bucket-brigade stages are clocked from a conventional two-phase digital clock pulse generator 12, the output of which is controlled by a clock control logic circuit 13. The analog input signal $s(t)$ and a signal for synchronizing the clock control logic therewith may be supplied to our system on a single communication channel by time-multiplexing or may be supplied on separate channels. The clock control logic 13 determines the intervals in which the BBDL is clocked for read-in of the analog information signal, or for recirculation thereof, and also determines the intervals in which such information is stored (held) in the BBDL between the read-in and first recirculate cycle, and between any additional recirculations as will be described in detail with respect to FIG. 2 which shows the details of the clock control logic. A continuous rectangular wave voltage signal derived from the master clock generator 12 in the clock control logic has a repetition rate which determines the total period for each read-in and hold interval or recirculate and hold interval. This continuous rectangular wave signal is supplied to a recirculation control logic circuit 14 that determines the number of recirculations to be preformed for each input analog information signal and will be described in detail with reference to the FIG. 3 recirculation control logic diagram. The output of the recirculation control logic 14 is supplied to the mode selector control logic circuit 15 which controls the state of mode selector switch 11 as will be described hereinafter with reference to FIG. 4. The output of the charge-transfer memory unit 10 is connected to an input thereof in the recirculation mode state of switch 11 by means of a feedback path including a gain block component 17 which may be of the automatic gain control (A.G.C.) or fixed gain type as determined by switch 19. The output of the memory unit 10 is also connected to the input of a low pass filter network 16 which recovers the baseband signal. The filter 16 in ideal form could be the output element of the memory unit 10, but in practice the non-ideal characteristics thereof dictate that it be connected outside the feedback loop in order to prevent an undesired slight phase shift in the recirculating signal. Filter network 16 is a conventional low pass type filter which, as one example, can include one or more L-sections of a series inductor and shunt capacitor. The output of filter 16 is connected to the input of a display monitor 18 which may be a conventional cathode ray tube or a television receiver in a time-shared video communication channel application of our invention. The operation of the display monitor is synchronized with the memory system operation by means of the signal generated in the recirculation control logic 14.

Our analog charge-transfer memory system operates in the following manner. Mode selector switch 11 is initially in its input signal read-in state whereby an analog input information signal is supplied to the input of the charge-transfer memory unit 10. At the same time, the control logic synchronizing signal supplied to clock control logic circuit 13 causes the logic therein to begin generating the continuous rectangular wave signal which determines the read-in, recirculate and hold periods. The read-in interval includes the generation of a first burst of the single phase, two-phase or multi-phase clock pulses $C_p$ of sufficient number to cause the analog input information signal to be read into the memory unit 10. In the case of the memory unit 10 being of the BBDL type, two-phase clock pulses $C_p$ and $\overline{C}_p$ are used. At the end of the first burst of clocking pulses, the sampled analog signal is held (stored) in the memory unit 10 for the "hold" interval established by the clock control logic. The "hold" interval may be as long as several hundred milliseconds. The maximum length of time that the analog information may be stored within the memory unit 10 is limited primarily by the reverse leakage current across the p-n junctions in the BBDL circuit embodiment of the memory unit, and by the equilibration time of CCD and SCT embodiments of the memory unit. At the end of the "hold" interval, the recirculation control logic 14 can cause the state of the mode selector switch 11 to switch to the recirculate mode whereby the feedback circuit including gain block 17 is connected from the output of memory unit 10 to the input thereof. The start of the recirculation cycle results in the generation of a second burst of clock cycles of number equal to that in the first burst. The second burst of clock pulses causes the sampled analog information to be read out of memory unit 10 and recirculated through the feedback loop and reentered into the memory unit 10. At the end of the recirculation, the information signal is again stored in the memory unit for the "hold" interval. During the recirculation interval, the analog information is displayed on the monitor unit 18 as it is being read out of the memory unit. The recirculation cycle (recirculate plus hold intervals) may be repeated a plurality of times as determined by the recirculation control logic. Thus, our memory system is especially suitable for applications where a given analog input information signal must be capable of being recalled repeatedly at will. After completion of the recirculation cycle or cycles, the state of the mode selector switch 11 is switched to the read-in mode and the read-in and recirculate cycles are repeated for the next analog input information signal.

In the case of memory unit 10 being of the BBDL type fabricated from MOSFET transistors, the memory unit includes a driver stage for providing suitable interfacing (correct bias and buffering) between the analog input signal source and the BBDL connected to the output of the driver stage. The BBDL may be of the serial type or serial/parallel type. The output of the BBDL, when a single BBDL is employed, is connected to a D.C canceller circuit for re-biasing the BBDL output signal to its original value at the BBDL input for a given duty cycle. The re-biasing is necessary since the memory unit is operated in a gated clock-mode wherein information is read into the BBDL and stored therein for a particular "hold" time interval by effectively turning off the clock generator for such interval, and then the clock is again turned on for the recirculation cycle. The re-biasing also compensates for leakage currents which vary with temperature to cause undesired D.C. level shifts at the single BBDL output. The differential connection of two BBDLs described in the aforementioned concurrently filed application Ser. No. 319,351, is a preferred embodiment of the BBDL component in memory unit 10 since it results in cancellation of all the undesired D.C. as well as the clock frequency components normally introduced in the operation of BBDL circuits. This feature permits relaxation of the post-brigade filter network 16 and provides for more stable or distortion-free operation of amplifiers which are generally utilized in post-brigade circuits such as the gain block 17 in the feedback loop. In the differential BBDL memory unit 10, two bucket-brigade delay lines have the same number of bucket-brigade stages which are clocked in parallel and in-phase. A balanced differential driver circuit is preferably utilized with the differential BBDL and includes both bias balance control and gain balance control to compensate for any difference between the two BBDLs such as in gain or D.C. level. The outputs of the two differentially connected BBDLs are differentially summed in a differential summer, and the resultant output thereof is a delayed sampled-data signal waveform, i.e., a sampled and delayed version of the analog input signal $s(t)$. The analog input signal is sampled at a sufficiently rapid rate such that the envelope of the sampled-data signal at the memory unit 10 output faithfully follows the input signal waveform.

Figure 2:
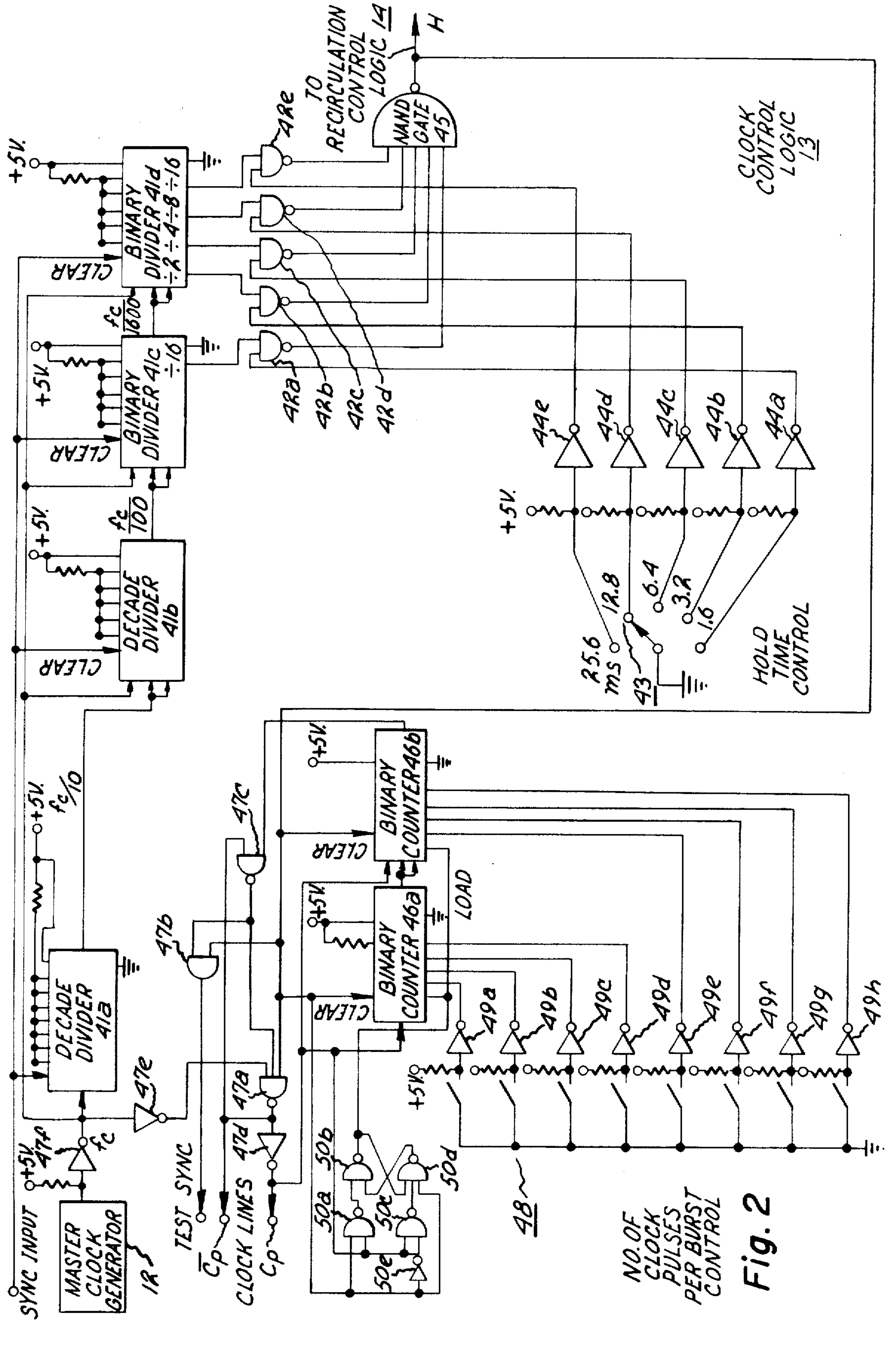
FIG. 2 is a schematic diagram of the clock control logic portion of the control logic circuit.
Figure 3:
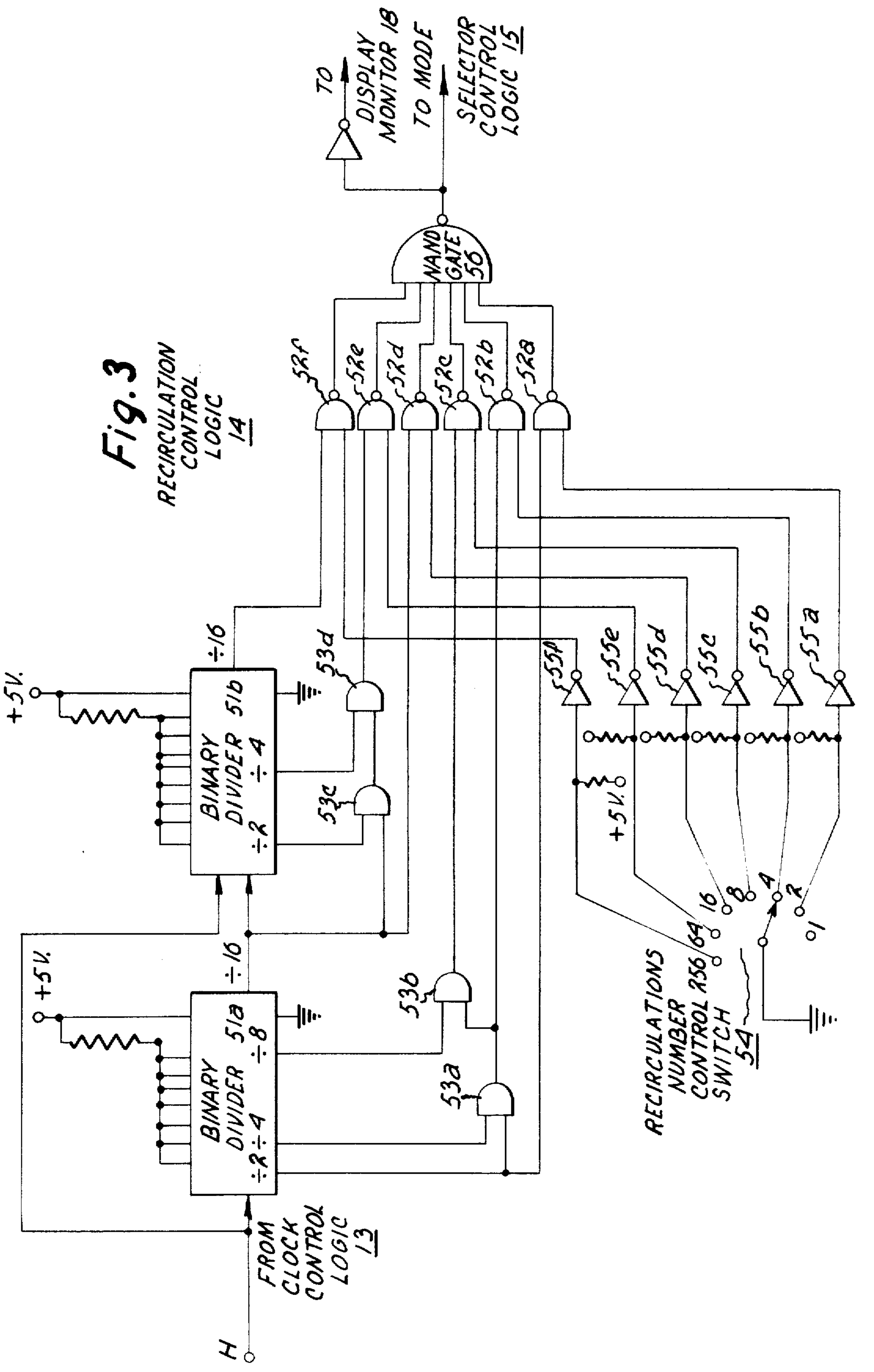
FIG. 3 is a schematic diagram of the recirculation control logic portion of the control logic circuit.
Figure 4:
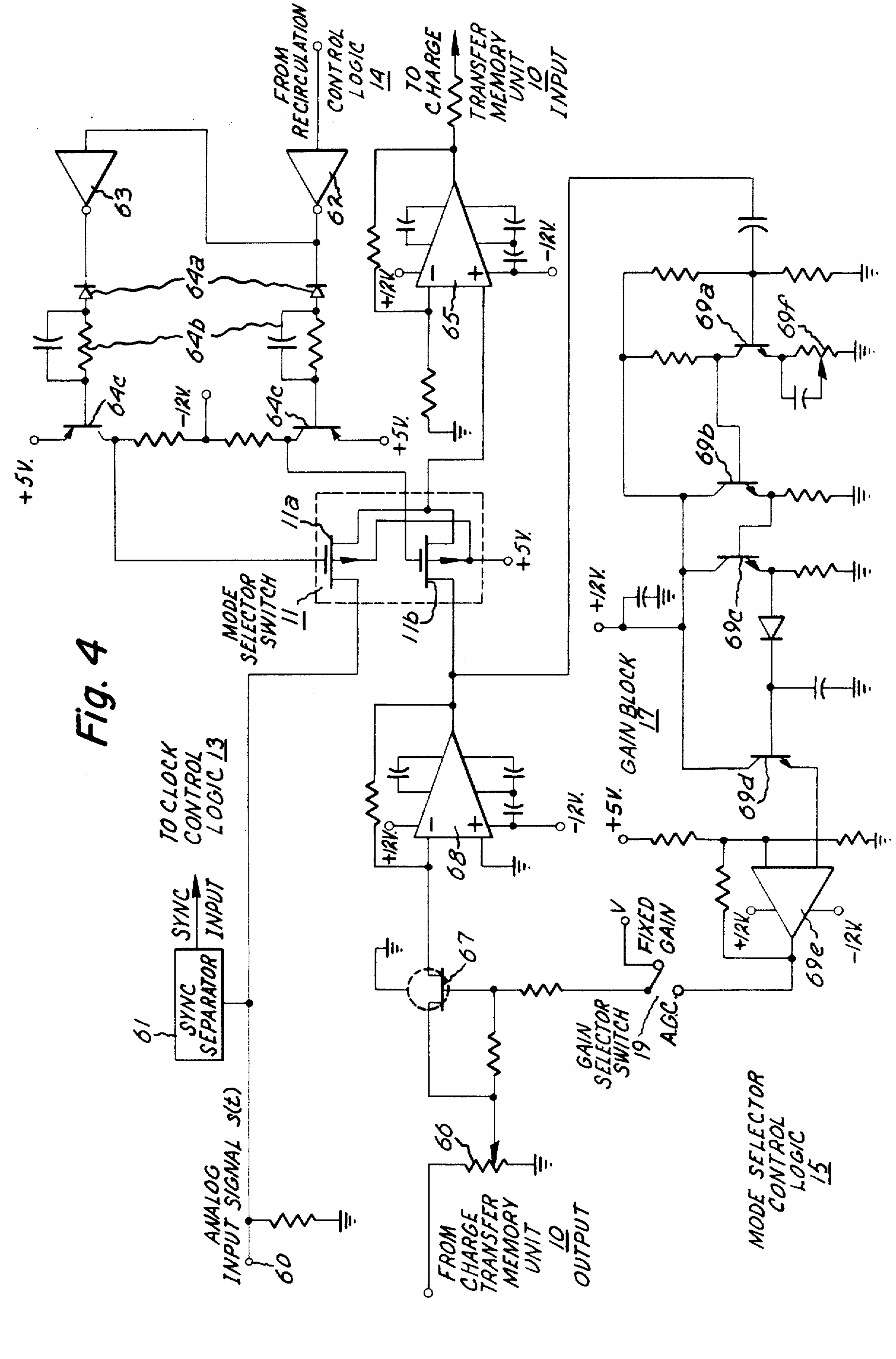
FIG. 4 is a schematic diagram of the mode selector control logic portion of the control logic circuit.

Referring now to our present invention, the logic circuit for controlling the operation of the charge-transfer memory system is illustrated in FIGS. 2–4 wherein FIG. 2 illustrates the clock control logic, FIG. 3 illustrates the recirculation control logic and FIG. 4 illustrates the mode selector control logic.

Figure 5A:
FIGS. 5*a*, *b*, *c*, *d*, *e*, *f* are voltage waveforms versus time appearing at various points in our memory system.
Figure 5B:
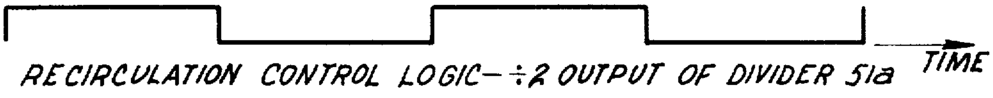
Figure 5C:
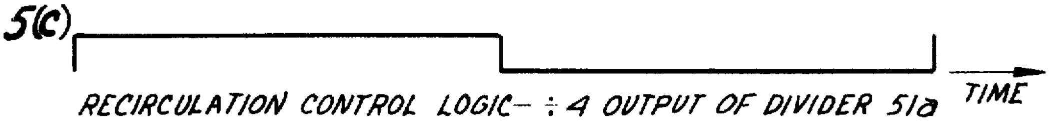
Figure 5D:
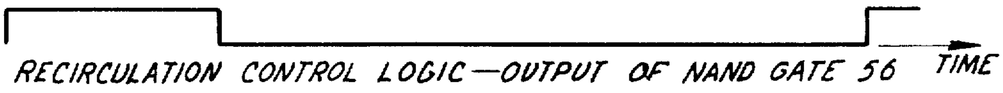
Figure 5E:
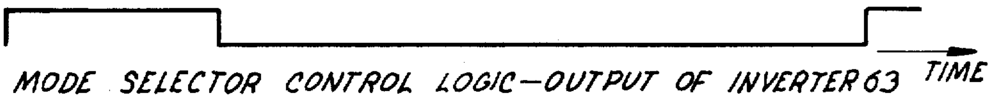
Figure 5F:
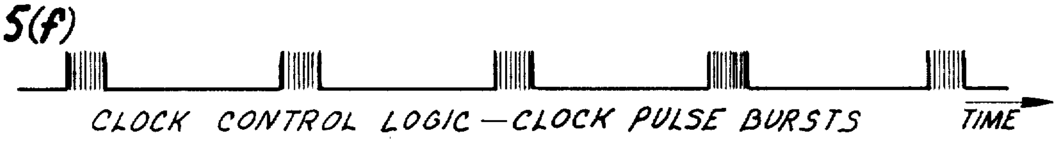

FIG. 2 illustrates the clock control logic circuit 13 which generates a continuous rectangular waveform voltage signal H that has a programmable repetition rate. This repetition rate determines the period of the read-in and any recirculation(s) cycles, and is also the input signal to the recirculation control logic in FIG. 3. Waveform H is illustrated in FIG. 5*a*. The clock control logic also includes a variable burst waveform generator that generates a programmable number of clock pulses in response to each rectangular wave H (i.e., a programmable number of clock pulses per burst thereof) as illustrated in FIG. 5*f* for either reading-in new information into the charge-transfer memory unit 10 or for recirculating the stored information. The burst of clock pulses are each generated at the positive-going edge of the H rectangular wave as shown in FIG. 5*f*, or may be generated at the negative-going edge by other conventional logic means.

The clock control logic circuit includes a master clock generator 12 for generating a continuous wave of rectangular wave voltage pulses at the clock frequency (or more correctly the repetition rate) $f_c$ which as one typical example may be 1 megahertz (mHz). The master clock frequency is supplied to the "clock" inputs of two decade dividers 41*a* and 41*b* and two binary dividers 41*c* and 41*d* connected in series circuit relationship (i.e., the divide-by-10 "carry" output of divider 41*a* is connected to the enable inputs of divider 41*b*, etc.). The "carry" outputs of the first 41*a* and second 41*b* decade dividers and binary divider 41*c* are thus voltages of continuous rectangular waveform of repetition rate $f_c/10$, $f_c/100$ and $f_c/1,600$, respectively. The continuous waveform "carry" pulses at the "carry" outputs of decade dividers 41*a* and 41*b* are of pulse width equal to the period of the rectangular wave clock pulses at the output of master clock generator 12. The second binary divider 41*d* has four outputs wherein the first output is a divide-by-2, the second a divide-by-4, the third a divide-by-8 and the fourth a divide-by-16. Thus, the frequency outputs available at the four outputs of binary divider 41d are $f_c/$ 3200, $f_c/6400$, $f_c/12,800$ and $f_c/25,600$. A more practical manner in depicting the outputs of binary dividers 41*c* and 41*d* is in terms of the period of each output rectangular wave.

Thus, the frequency output $f/1600$ is equal to a rectangular wave having a period of 1.6 milliseconds, the divide-by-2 output of binary divider 41*d* has a period of 3.2 milliseconds, the divide-by-4 output a period of 6.4 milliseconds, the divide-by-8 output a period of 12.8 milliseconds and the divide-by-16 output a period of 25.6 milliseconds. The SYNC INPUT signal for synchronizing the bursts of clock pulses with the analog input signal $s(t)$ is applied to the "clear" input of dividers 41*a–d*. The synchronizing (SYNC INPUT) signal would generally be time-multiplexed with the analog input signal.

The divide-by-16 output of binary divider 41c and the four outputs (divide-by-2, 4, 8 and 16) of binary divider 41*d* are connected to first inputs of NAND gates 42*a*, 42*b*, 42*c*, 42*d* and 42*e*, respectively. NAND gates 42*a–e* are positive logic devices. Thus, the output of a NAND gate switches to the low state only when both inputs are in the high state. The second inputs to NAND gates 42*a–e* are supplied from a positive polarity voltage biased circuit of five inverters 44*a–e* controlled by five-position (five-state) "hold time" control switch 43. Switch 43 may be electronic or mechanical and it selects the particular one of the five inverters to have its input switched to ground through switch 43 and thereby have its output switched to the high state. The power supply voltage applied to the various components of our logic circuits is +5 volts in the $T^2L$ logic used throughout, but also includes ±12 volts in the FIG. 4 circuit. The particular state of switch 43 thus determines which output of NAND gates 42*a–e* will be switched to the low state in response to the positive polarity half period of the binary divider output associated therewith. In the particular state of switch 43 illustrated in FIG. 2, the divide-by-8 output of binary divider 41*d* is passed to NAND gate 45 through NAND gate 42*d*. Thus, the output of NAND gate 45 is a continuous rectangular waveform signal H having a period of 12.8 milliseconds (ms) as indicated by the illustrated selected state of switch 43. The particular state of switch 43 is determined by the application of our system. In an application for refreshing the video display on a subscriber's video monitor in a time-shared video communication system, and having three second intervals between new frames of video information as mentioned above, the logic circuitry and master clock frequency would be selected so that the rectangular waveform signal H repetition rate would have a period of 16.7 milliseconds in order to obtain 180 recirculations for refreshing the video display monitor.

The output of NAND gate 45 is also applied to the "clear" inputs of binary counters 46*a* and 46*b* as well as to first inputs of NAND gate 47*a* and AND gate 47*b*. The (count-by-16) "carry" output of counter 46*a* is connected to the "enable" inputs of counter 46*b* and the (count-by-16) "carry" output thereof is connected to a first input of NAND gate 47*c*. The output of NAND gate 47*c* is connected to a second input of NAND gate 47*a* and to a second input of AND gate 47*b*. The output of NAND gate 47a is connected to the input of inverter 47*d* and to a second input of NAND gate 47*c*. The output of inverter 47*d* is connected to the "clock" inputs of counters 46*a* and 46*b*. The output of an inverter 47*f* which is connected to the "clock" input of dividers 41*a–d* is also connected through a second inverter 47*e* to a third input of NAND gate 47*a*. The output of inverter 47*d* provides the (single-phase) clock pulses to the memory unit 10 on the clock line $C_p$. In the case of the memory unit 10 incorporating a BBDL, two-phase clock pulse are required and the output of NAND gate 47*a* provides the complementary clock pulses $\overline{C}_p$. The addition of simple logic to the $C_p$ and $\overline{C}_p$ clock lines readily converts the circuit to three-phase or four-phase clock lines when required by the particular memory unit 10 employed. The output of AND gate 47*b* supplies a pulse synchronized with the beginning of each burst of clock pulses and may be used for test purposes. The circuit defined by gates 47*a–e* operates in the following manner:

When the output of NAND gate 45 goes from low to high, NAND gate 47*a* is enabled thereby allowing clock pulses of frequency $f_c$ to be fed to clock line $C_p$ and, by means of inverter 47*d*, to clock line $\overline{C}_p$. Since the output of NAND gate 50*b* is at a low state as the result of the output of NAND gate 45 having been low, the "load" inputs of binary counters 46*a* and *b* are enabled thereby allowing the logic states of the flip-flops comprising these counters to be set to the logic states present at the outputs of inverters 49*a–h*. The outputs of inverters 49*a–h*, which are connected to the "data" inputs of counters 46*a* and *b*, are controlled by switch 48, in a manner similar to the operation of the "hold time" control circuit of switch 43 and inverters 44*a–e*, with the exception that switch 48 may have more than one closed state among its eight positions to thereby achieve a greater selection of the number of clock pulses per burst. NAND gates 50*a–d* comprise a conventional type D flip-flop whose purpose is to provide a time delay of $1/f_c$ before the high state of NAND gate 45 is applied to the "load" inputs of the aforesaid binary counters since such counters require a clock pulse while the "load" input is low in order to set the flip-flop in the desired manner that has been previously described.

During the second half of the first clock cycle, the output of NAND gate 50*b* is switched to a high state by means of the clock applied to first inputs of NAND gates 50*a* and 50*c* together with the output of NAND gate 45 applied to a second input of NAND gate 50*a* and such output, applied through inverter 50*e*, to second input of NAND gate 50*c*. The "load" inputs of binary counters 46*a* and *b* are inhibited in the high state so that the aforesaid counters begin to count the clock pulses that are passed to the clock lines.

The number of clock pulses allowed to pass to the clock lines is determined by the difference between the number that is initially stored in counters 46*a* and *b* by the "load" sequence just described, and the maximum count that the counters can attain, 256. For example, if a 248 pulse burst is desired, the decimal number 8 (256–248 = 8) is entered in binary form onto switches 48. During the first clock cycle of the burst, this binary number is entered into counters 46*a* and *b* as the initial state of the aforesaid counters and the counters begin counting from this number. 248 clock pulses may therefore occur before the aforesaid counters reach their maximum count of 256 at which the the "carry" output of counter 46*b* output goes high. During the portion of the clock cycle that inverter 47*c* is low, the output of NAND gate 47*a* will be high and this, combined with the high state of the "carry" output of counter 46*b* will force the output of NAND gate 47*c* low, thereby inhibiting NAND gate 47*a*, and terminating the clock burst.

The clock burst control logic is re-set in preparation for the next burst by the output of NAND gate 45 going to its low state which sets counters 46*a* and *b* to a binary equivalent of zero, causes the output of NAND gate 50*b* to go to zero, and inhibits NAND gate 47*a*. The output of NAND gate 47*c* goes to its high state as a result of re-setting binary counters 46*a* and 46*b*, and remains high until the next time that a "carry" output is received from counter 46*b*.

As stated hereinabove, the "hold" time control circuit which includes switch 43, inverters 44*a–e*, NAND gates 42*a–e* and 45 and the outputs of binary dividers 41*c*, 41*d* provides a programmable continuous rectangular waveform signal H of fixed repetition rate which determines the fixed period of each "read-in" and subsequent "hold" (information storage period) cycle or "recirculation" and subsequent "hold" cycle. The second control circuit which includes mechanical (or electronic) switch 48, the plurality of positively biased inverters 49*a, b, c, d, e, f, g* and *h* and binary counters 46*a* and *b* provides a programmable number of clock pulses (at the master clock frequency) for each burst thereof to be applied to clock line $\overline{C}_p$ (and $C_p$ in a two phase system for clocking the BBDL(s)) during each period of the H signal. The clock burst control switch 48 thus provides the control for a variable burst waveform generator which is another aspect of our invention and which is comprised of elements 46*a, b*, 47 *a–e*, 48, 49 and 50 *a–d*. The advantages of the variable burst waveform generator are that in controlling the number of clock pulses per burst, (1) the sampled analog information signal can be positioned in a specific location of the memory unit (i.e., the analog signal may be 20 samples in a 100 stage BBDL), (2) it can sequence in more than one analog signal when the memory unit stages are much greater in number than the samples in one signal, and (3) the analog memory system can have a variable memory size unit.

The bursts of clock pulses impressed on the clock lines $C_p$ and $\overline{C}_p$ in the FIG. 2 clock control logic circuit are of positive polarity voltage. The clock pulses are translated to negative polarity prior to being applied to the BBDL(s) by means of a conventional MOSFET gate driver circuit (not shown). As stated above, the relationship of bursts of clock pulses to the continuous rectangular wave signal H at the output of NAND gate 45 which determines the period of each read-in or recirculation cycle including the hold period is illustrated in FIG. 5*f* referenced with respect to FIG. 5*a*.

Referring now to the recirculation control logic depicted in FIG. 3, the continuous rectangular wave output H of NAND gate 45 in the clock control logic of FIG. 2 (having a repetition rate which determines the period of each complete read-in and subsequent hold time and each recirculation and subsequent hold time cycle) is supplied to the clock inputs of serially connected binary dividers 51*a* and 51*b*. The divide-by-16 output of divider 51*a* is connected to an enable input of binary divider 51*b*, a first input of AND gate 53*c* and to a first input of NAND gate 52*d*. The divide-by-2 output of binary divider 51*a* is connected to first inputs of NAND gate 52*a* and AND gate 53*a*. A second input to AND gate 53*a* is connected from the divide-by-4 output of binary divider 51*a*. The divide-by-8 output of divider 51*a* is connected to a first input of AND gate 53*a*. The output of AND gate 53*a* is connected to a second input of AND gate 53*b* and to a first input of NAND gate 52*b*. The output of NAND gate 53*b* is connected to a first input of NAND gate 52*c*. The divide-by-2 output of binary dividier 51*b* is connected to a second input of AND gate 53*c*. The output of AND gate 53*c* as well as the divide-by-4 output of binary divider 51*b* are respectively connected to first and second inputs of AND gate 53*d*. The output of AND gate 53*d* is connected to a first input of NAND gate 52*e*. Finally, the divide-by-16 output of binary divider 51*b* is connected to a first input of NAND gate 52*f*. The second inputs to NAND gates 52 *a–f* are supplied from a positive polarity biased circuit of six inverters 55*a–f* controlled by seven-position "recirculations number" control switch 54. Switch 54 selects the particular one of the six inverters to have its input switched to ground through switch 54 and thereby have its output switched to the high state. In the seventh position of switch 54, the switch is in an open state. The particular position of switch 54 thus determines which output of NAND gates 52*a–f* will be switched to the low state in response to the positive polarity half period of the binary divider output associated therewith as in the case of the "hold time" control in the clock control logic. In the particular position of switch 54 illustrated in FIG. 3, the divide-by-2 and divide-by-4 outputs of binary divider 51*a* determine the signal to be passed through NAND gate 52*b* to NAND gate 56. The waveforms versus time of the voltage signals appearing at these divide-by-2 and 4 outputs of binary divider 51*a* are shown in FIG. 5*b* and *c* respectively. The outputs of NAND gates 52*a–f* are connected to inputs of NAND gate 56, and the output thereof is supplied to the mode selector control logic circuit illustrated in FIG. 4. The waveform output of NAND gate 56 for the illustrated position of switch 54 is shown in FIG. 5*d*. It can be seen that the output of NAND gate 56 is in the high state only when both of the divide-by-2 and divide-by-4 outputs of binary divider 51*a* are in the high state, otherwise it is in the low state. Thus, as illustrated in FIG. 5*d*, the output of NAND gate 56 remains in the high state for the first period of the "hold time" control waveform illustrated in FIG. 5*a* and switches to and remains in the low state for the following three periods during which time the information is recirculated and stored in the charge-transfer memory unit 10 three times. Thus, the numerals associated with the various switch positions of switch 54 indicate one plus the number of recirculations. In the seventh (open) position of switch 54, the numeral 1 associated therewith indicates there are no recirculations. The operation of switch 54 in the other positions as well as the functions of the other AND gates and NAND gates is similar to that described with reference to the illustrated second position of the switch and therefore need not be described herein. The output of NAND gate 56 is also applied to the display monitor 18 for controlling such monitor.

Referring now to FIG. 4, there is shown the mode selector control logic. The analog input signal s(t) which is to be sampled and delayed by the charge-transfer memory unit 10 is applied to an input terminal 60 of our system. This terminal 60 is connected to the source electrode of a first MOSFET 11*a* in mode selector switch 11. A SYNC separator circuit 61 is also connected to the conductor supplying the analog input signal to mode selector switch 11 for moving the clock control logic synchronizing signal that is transmitted with the analog input signal. The output of NAND gate 56 in the recirculation control logic 14 is applied to the gate electrodes of MOSFETS 11*a* and 11*b* in mode selector switch 11. The recirculation control logic signal is applied through a first inverter 62 and then such signal is passed through two parallel circuits one of which includes a second inverter 63 for inverting the signal with respect to the signal in the other branch circuit. Each branch circuit includes a diode 64*a*, a parallel R-C circuit 64*b*, and a bipolar transistor 64*c*. The function of each circuit comprising elements 64*a*, 64*b* and 64*c* is to shape the waveforms supplied by inverters 62 and 63 before they are applied to the base electrodes of transistors 64*c* so as to minimize the switching times of these transistors. The drain electrodes of MOSFETS 11*a* and 11*b* are interconnected to an input of an operational amplifier 65 which functions as a noninverting buffer amplifier that provides the required interface between the mode selector switch 11 and charge-transfer memory unit 10, and also acts as a signal driver for the memory circuit. The output of operational amplifier 65 is connected to the input of the driver circuit in charge-transfer memory unit 10. The output of the memory unit 10 is connected to the source electrode of MOSFET 11*b* in the mode selector swtich 11 through a fixed gain control consisting of potentiometer 66, field effect transistor 67 and operational amplifier 68 in the case when the gain selector switch 19 is in the fixed gain position. With gain selector switch 19 in the fixed gain position, a bias voltage is supplied to the gate electrode of FET 67 from voltage source V. With gain selector switch 19 in the AGC position (automatic gain control), a negative feedback circuit is connected from the output of operational amplifier 68 to the input thereof through FET 67 which functions as a variable resistor and thereby controls the gain of amplifier 68 to prevent gain drifts in the memory unit with temperature. Obviously, in the case wherein the charge-transfer memory unit 10 includes two BBDLs connected in push-pull or differential relationship, the automatic gain control feature is generally not necessary. The automatic gain control circuit is conventional, and as one example, includes four serially connected bipolar transistors 69*a*, *b*, *c* and *d* and operational amplifier 69*e*. The gain can be automatically held by the AGC circuit and is determined by the setting of the potentiometer 69*f* in the emitter circuit of the first transistor 69*a*.

Mode selector switch 11 may be described as an analog gate switch and the gating signals applied thereto from the recirculation control logic 14 determine the operation of such switch. Thus, the signal from the recirculaion control logic 14 with switch 54 in a position for three recirculations has the waveform depicted in FIG. 5(*d*). This signal, upon inversion through inverter 62, is applied to the gate driver (transistor 64*c*) connected to the gate electrode of MOSFET 11*b* whereas the noninverted waveform signal of FIG. 5(*e*), due to a second inversion through inverter 63, is applied to the gate driver connected to the gate electrode of MOSFET 11*a*. As a result, during the high state of the waveform depicted in FIG. 5*d* and concurrently high state of the FIG. 5*e* waveform which occur during the first period of the "hold" control waveform depicted in FIG. 5*a*, the mode selector switch transistor 11*a* conducts and thereby passes the analog input signal 5(*t*) to the input of the memory unit 10. At this time transistor 11*b* is in a nonconducting state and therefore the feedback circuit around the charge-transfer memory unit is open. As seen in FIG. 5*f*, a burst of clock pulses of number selected by switch 48 in the clock control logic are applied to the memory unit 10 beginning with the positive going edge of the H signal to cause new information (analog input signal $s(t)$) to be read into the memory unit. During the remaining portion of the first period of the "hold" control waveform (FIG. 5*a*), the clock pulses are not applied to the clock lines $C_p$ (and $\overline{C}_p$ in the case of a two-phase system) and therefore the sampled analog information is stored within the memory unit 10. During the second, third and fourth periods of the "hold" control waveform, the high state of the inverted recirculation control logic signal at the output of inverter 62 causes MOSFET 11*b* to conduct and the low state of the signal at the output of inverter 63 in FIG. 5*b* causes MOSFET 11*a* to be in a nonconducting state. In this condition, the output of the charge-transfer memory unit 10 is connected to the input thereof and obtains the recirculation mode of operation in which the informtion signal is recirculated during the "on" time of the clock pulses and then remains stored in the memory unit during the "hold" period between the bursts of clock pulses. In the case of recirculation number control switch 54 being in the zero recirculation position, MOSFET 11a remains in its conducting state during each period of the "hold" control waveform.

As a result of the specific embodiment of the clock control logic and recirculation control logic described relative to FIGS. 2 and 3, it can be seen that each cycle of operation for read-in or recirculation can be selected to have one of five fixed periods between 1.6 and 25.8 milliseconds by means of "hold time" control switch 43, the number of clock pulses per burst can be controlled over a range from two to 256 by means of switch 48, and the number of recirculations can be selected in a range from 0 to 255 by means of switch 54. The "hold time" control switch 43 would be utilized where versatility in the periods between refreshing of the display monitor is required. The particular combination of "hold time" control selected by switch 43 and the number of recirculations selected by switch 54 would depend upon the particular application of our system.

The particular binary dividers and counters described herein are of the model number 74161 manufactured by Texas Instruments, Inc. The decade dividers are model number 74160. All of the other logic gates are of compatible types.

From the foregoing, it can be appreciated that the objectives set forth have been met in that our invention provides a logic circuit for controlling the operation of an analog charge-transfer memory system having a nondestructive read-out capability since each recirculation is applied to the display monitor and such information can be kept stored within the memory unit until the next successive input information is applied. Obviously, other numbers of recirculations can be obtained by using additional binary logic circuitry at the inputs to NAND gates 52*a-f*. In like manner the "hold time" control can be varied. It is, therefore, to be understood that changes may be made in the particular embodiment of our invention as described which are within the full intended scope of our invention as defined by the following claims.

What we claim as new and desire to secure by Letters Patent of the U.S. is:

1. A logic circuit for controlling the operation of an analog memory system having the memory unit thereof fabricated from charge-transfer devices and comprising a clock control logic circuit comprising
a clock generator for generating a continuous rectangular waveform voltage clock pulse signal at a particular repetition rate,
first means connected to an output of said clock generator for providing a plurality of continuous rectangular first waveform voltage signals each having a repetition rate less than the repetition rate of the clock pulse signal,
second means connected to an output of said first means for selecting one of the plurality of continous rectangular first waveform signals to thereby provide a programmable repetition rate rectangular second waveform signal which determines the periods of read-in and recirculation cycles of operation of the analog memory system, and
third means connected to an output of said second means and to an output of said clock generator for determining the number of clock pulses supplied from said clock generator to charge-transfer devices in a memory unit of the analog memory system to cause propagation of a sampled analog information signal through the memory unit for each read-in and recirculation cycle,
a recirculation control logic circuit comprising
fourth means connected to an output of said second means for providing a plurality of continuous rectangular third waveform voltage signals each having a repetition rate less than the repetition rate of the rectangular second waveform signal, and
fifth means connected to outputs of said fourth means for selecting one of the plurlaity of continuous rectangular third waveform signals to thereby provide a programmable repetition rate rectangular fourth waveform signal which determines the number of recirculation cycles between successive read-in cycles, and
a mode selector control logic circuit comprising
a first switch device having an input connected to an input terminal of the analog memory system to which is applied the analog information signal to be sampled,
a second switch device having an input connected to an output of a feedback circuit connected around the memory unit,
outputs of said first and second switch devices connected to an input of the memory unit, said first switch device having a control input connected to an output of said fifth means, and
an inverter connected between the output of said fifth means and a control input of said second switch device for inverting the state of the rectangular fourth waveform signal applied thereto relative to the corresponding signal applied to the control input of said first switch device, the states of the noninverted and inverted fourth waveforms applied respectively to the control inputs of said first and second switch devices determining which switch device is in a closed state while the other is in an open state so that said first and second switch devices respectively connect the memory unit in a read-in mode and recirculate mode, the clock pulses controlled in number by said third means being supplied as a burst thereof for a first portion of each read-in and recirculate period, the sampled analog information being stored in the memory unit for a second portion of each read-in and recirculate period in the absence of the clock pulses, the information being stored in the memory unit for a second portion of each read-in recirculate cycle in the absence of the clock pulses, the storage and recirculation of the analog information permitting a nondestructive read-out capability for the memory system.

2. The logic circuit set forth in claim 1 wherein
said first means comprises at least two serially connected decade dividers for dividing the repetition rate of the clock pulse signal by 10 and 100.

3. The logic circuit set forth in claim 1 wherein
said first means comprises at least two serially connected binary dividers for dividing the repetition rate of the clock pulse signal by integers corresponding to the particular outputs of said binary dividers connected to inputs of said second means.

4. The logic circuit set forth in claim 1 wherein
said first means comprises at least one decade divider serially connected with at least one binary divider for dividing the repetition rate of the clock pulse signal by integers corresponding to the particular outputs of said decade and binary dividers connected to inputs of said second means.

5. The logic circuit set forth in claim 1 wherein
said second means comprises
a plurality of first NAND logic gates having first inputs connected to different outputs of said first means,
a multi-position third switch device having a number of positions equal to the plurality of first NAND gates, each switch position connected to a second input of a corresponding one of said plurality of first NAND gates, said third switch device selectively providing one of the second inputs of said plurality of first NAND gates with a high state input, and
a second NAND gate having inputs connected to outputs of said plurality of first NAND gates so that said third switch device provides at an output of said second NAND gate the rectangular second waveform signals of the programmable repetition rate which determines the periods of the read-in and recirculation cycles.

6. The logic circuit set forth in claim 1 wherein
said third means comprises
a counter having a CLEAR input connected to the output of said second means, at least one DATA input of said counter connected to a source of positive polarity voltage for providing a high state input thereto, and
NAND logic gate means having a first input connected to the output of said second means, a second input connected to a CARRY output of said counter and a third input connected to the output of said clock generator, output of said NAND logic gate means supplying the bursts of clock pulses to the charge-transfer devices in the memory unit and also connected to a CLOCK input of said counter.

7. The logic circuit set forth in claim 1 wherein
said third means comprises
at least one binary cóunter having a CLEAR input connected to the output of said second means, a multi-position fourth switch device having a plurality of positions connected to DATA inputs of said binary counter, said fourth switch device selectively porividing at least one of the DATA inputs of said binary counter with a high state input to thereby provide a programmable burst of the clock pulses, and NAND logic gate means having a first input connected to the output of said second means, a second input connected to a CARRY output of siad binary counter and a third input connected to the output of said clock generator, output of said NAND logic gate means connected to a CLOCK input of said binary counter and also supplying the burst of clock pulses to the charge-transfer devices in the memory unit.

8. The logic circuit set forth in claim 1 wherein said fourth means comprises at least one binary divider for dividing the repetition rate of the second waveform signal by integers corresponding to the particular outputs of said binary divider connected to inputs of said fifth means.

9. The logic circuit set forth in claim 1 wherein said fifth means comrpises

NAND logic gate means having first inputs connected to outputs of said fourth means, a multi-position fifth switch device having a plurality of switch positions connected to second inputs of said NAND logic gate means, said fifth switch device selectively providing one of the second inputs of said NAND gate means with a high state input, and a NAND gate having inputs connected to outputs of said NAND logic gate means so that said fifth switch device provides at an output of said NAND gate the rectangular fourth waveform signals of the programmable repetition rate which determines the number of recirculation cycles between successive read-in cycles.

10. The logic circuit set forth in claim 9 wherein said multi-position fifth switch device has an additional position which is open and said fifth switch device when operated into said open position providing operation of the memory system with no recirculations.

11. The logic circuit set forth in claim 1 wherein said first and second switch devices in said mode selector control logic circuit consist of first and second MOSFETs, respectively, the input terminal of the analog memory system connected to a source electrode of said first MOSFET, the output of the feedback circuit connected to a source electrode of said second MOSFET, the output of said fifth means connected in a noninverted state to a gate electrode of said first MOSFET, the output of said fifth means connected in an inverted state to a gate electrode of said second MOSFET, drain electrodes of said first and second MOSFETs interconnected to the input of the memory unit.

* * * * *